United States Patent
Madabushi et al.

(10) Patent No.: US 9,521,071 B2
(45) Date of Patent: Dec. 13, 2016

(54) FEDERATION OF CONTROLLERS MANAGEMENT USING PACKET CONTEXT

(71) Applicants: Rajesh Kumar Madabushi, Hyderabad (IN); Srinivasa R. Addepalli, San Jose, CA (US)

(72) Inventors: Rajesh Kumar Madabushi, Hyderabad (IN); Srinivasa R. Addepalli, San Jose, CA (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 110 days.

(21) Appl. No.: 14/664,913

(22) Filed: Mar. 22, 2015

(65) Prior Publication Data

US 2016/0277289 A1    Sep. 22, 2016

(51) Int. Cl.
| | |
|---|---|
| H04L 12/28 | (2006.01) |
| H04L 12/721 | (2013.01) |
| H04L 29/08 | (2006.01) |
| H04L 12/801 | (2013.01) |
| H04L 12/26 | (2006.01) |
| H04L 29/06 | (2006.01) |
| H04L 12/24 | (2006.01) |

(52) U.S. Cl.
CPC ............ *H04L 45/38* (2013.01); *H04L 43/106* (2013.01); *H04L 47/12* (2013.01); *H04L 67/1095* (2013.01); *H04L 67/2842* (2013.01); *H04L 41/0816* (2013.01); *H04L 69/16* (2013.01)

(58) Field of Classification Search
USPC .......................... 370/236, 252, 351, 389, 392
See application file for complete search history.

(56) References Cited

U.S. PATENT DOCUMENTS

| | | | |
|---|---|---|---|
| 8,306,948 B2 | 11/2012 | Chou et al. | |
| 2009/0144343 A1 | 6/2009 | Holt et al. | |
| 2011/0317701 A1* | 12/2011 | Yamato | H04L 49/25 370/392 |
| 2012/0320920 A1* | 12/2012 | Akiyoshi | H04L 45/42 370/392 |
| 2013/0010600 A1* | 1/2013 | Jocha | H04L 43/026 370/236.2 |
| 2013/0064243 A1* | 3/2013 | Akiyoshi | H04L 45/38 370/389 |
| 2013/0311433 A1 | 11/2013 | Gero et al. | |

(Continued)

OTHER PUBLICATIONS

Tootoonchain, Amin and Ganjali, Yashar; "HyperFlow: A Distributed Control Plane for OpenFlow", www.usenix.org/legacy/event/inm10/tech/full_papers/tootoonchain.pdf, 2010.

(Continued)

*Primary Examiner* — Kwang B Yao
*Assistant Examiner* — Nguyen Ngo
(74) *Attorney, Agent, or Firm* — Charles E. Bergere

(57) ABSTRACT

In a network control system, a method for managing traffic flow in a distributed controller environment includes stamping a packet to be forwarded between data forwarding units with flow control information based on an action set associated with a flow entry pushed by a logical controller. The packet is stamped by one or more of the data forwarding units. The flow control information is used to forward the packet between data forwarding units, thereby defining a datapath packet flow.

13 Claims, 11 Drawing Sheets

(56) References Cited

U.S. PATENT DOCUMENTS

| | | | | |
|---|---|---|---|---|
| 2015/0016477 A1* | 1/2015 | Ogawa | .................... | H04L 45/64 |
| | | | | 370/503 |
| 2015/0019756 A1* | 1/2015 | Masuda | .............. | H04L 41/0896 |
| | | | | 709/242 |
| 2015/0249587 A1* | 9/2015 | Kozat | .................... | H04L 43/10 |
| | | | | 370/222 |
| 2016/0142285 A1* | 5/2016 | Lee | ......................... | H04L 45/22 |
| | | | | 370/392 |
| 2016/0142474 A1* | 5/2016 | Itsumi | .................... | H04L 67/10 |
| | | | | 370/390 |
| 2016/0232019 A1* | 8/2016 | Shah | .................... | G06F 9/45533 |
| 2016/0242074 A1* | 8/2016 | Karino | .................. | H04W 28/10 |

OTHER PUBLICATIONS

Yazici, Volkan; Sunay, M. Oguz; and Ercan, Ali O.; "Controlling a Software-Defined Network in Distributed Contrrollers", In NEM Summit, 2012.

Tung, Ye and Che, Hao, "A flow caching mechanism for fast data packet forwarding", Computer Communications D0 (2002) 000-000, Apr. 19, 2001.

* cited by examiner

FEDERATION OF CONTROLLERS MANAGEMENT USING PACKET CONTEXT

BACKGROUND

The present invention relates to communications network traffic flow, and, more particularly, to synchronization of controllers in distributed controller environments.

Many enterprises have large and sophisticated geographically dispersed networks. These large networks include switches, routers, controllers and other networked devices to support the flow of data across the network. Data centers use multiple controllers to manage data forwarding units (such as switches, routers, etc.) to ensure a smooth flow of data across networks within the enterprise. Each controller manages a data forwarding unit of a particular data center to avoid impacts on latency. Such a distribution of controllers may be referred to as a distributed controller environment.

In a distributed controller environment, multiple controllers are involved in managing flow entries associated with the data forwarding units. Typically, one set of data forwarding units is assigned one or more controllers (also referred to as logical controllers). The logical controllers for different sets of data forwarding units synchronize flow entries among each other before adding the flow entry to the data forwarding units. Such proactive synchronization can lead to additional network traffic.

Proactive synchronization also can result in an error due to permanent loss of flow entry because of the network traffic. Further, storage of flow entries for regular synchronization is taxing on network resources. Furthermore, proactive synchronization may cause delay in synchronizing flow details with multiple controllers, thereby creating latency problems in network traffic management.

Therefore, there is a need for more efficient management of data forwarding units in a distributed controller network.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

While aspects of the below described network control system and method for managing traffic flow in a distributed controller environment may be implemented in any number of different computing systems, environments, and/or configurations, the embodiments are described in the context of the following exemplary system.

The following are definitions of certain words and phrases used throughout the specification:
(a) Control Plane: A part of the SDN that serves the data plane for bearing data traffic in the SDN.
(b) Data forwarding unit: A network device for forwarding data from a source point to a destination point in the SDN.
(c) Datapath: A collection of functional units for performing data processing in a Software Defined Network (SDN).
(d) Data Plane: A part of the SDN for carrying data traffic and enabling a transfer of data between various components in the SDN.
(e) Distributed Controllers: Plurality of Controllers distributed in a distributed control plane architecture where each controller is allocated for performing control protocol functions.
(f) Federation of Controllers: A process of allocating a separate controller in each region for managing switches available within that region instead of having a single centralized controller for managing all switches.
(g) Flow cache: Each controller maintains a cache of flow entries received from every other controller. This cache is referred to before contacting an original controller for the flow entry.
(h) Flow table: A table that is a part of a data forwarding unit. Each packet that enters a data forwarding unit passes through one or more flow tables.
(i) Logical Controller: A control point in the SDN that relays flow information to switches/routers and applications.
(j) Original Logical Controller: A logical controller originally relaying flow information to the switches/routers for defining a flow of the data without making a request from any other controller.
(k) Proactive synchronization: A process of proactively informing and updating each controller with flow entry details.
(l) Reactive Synchronization: A process of providing flow details from one controller upon receiving a request from another controller. Reactive synchronization provides synchronization on demand.
(m) Table miss-flow entry: Table miss-flow entry occurs when no entry is found in a flow table for processing the packet and the packet is sent to a controller for adding a flow entry.

Figure 1:
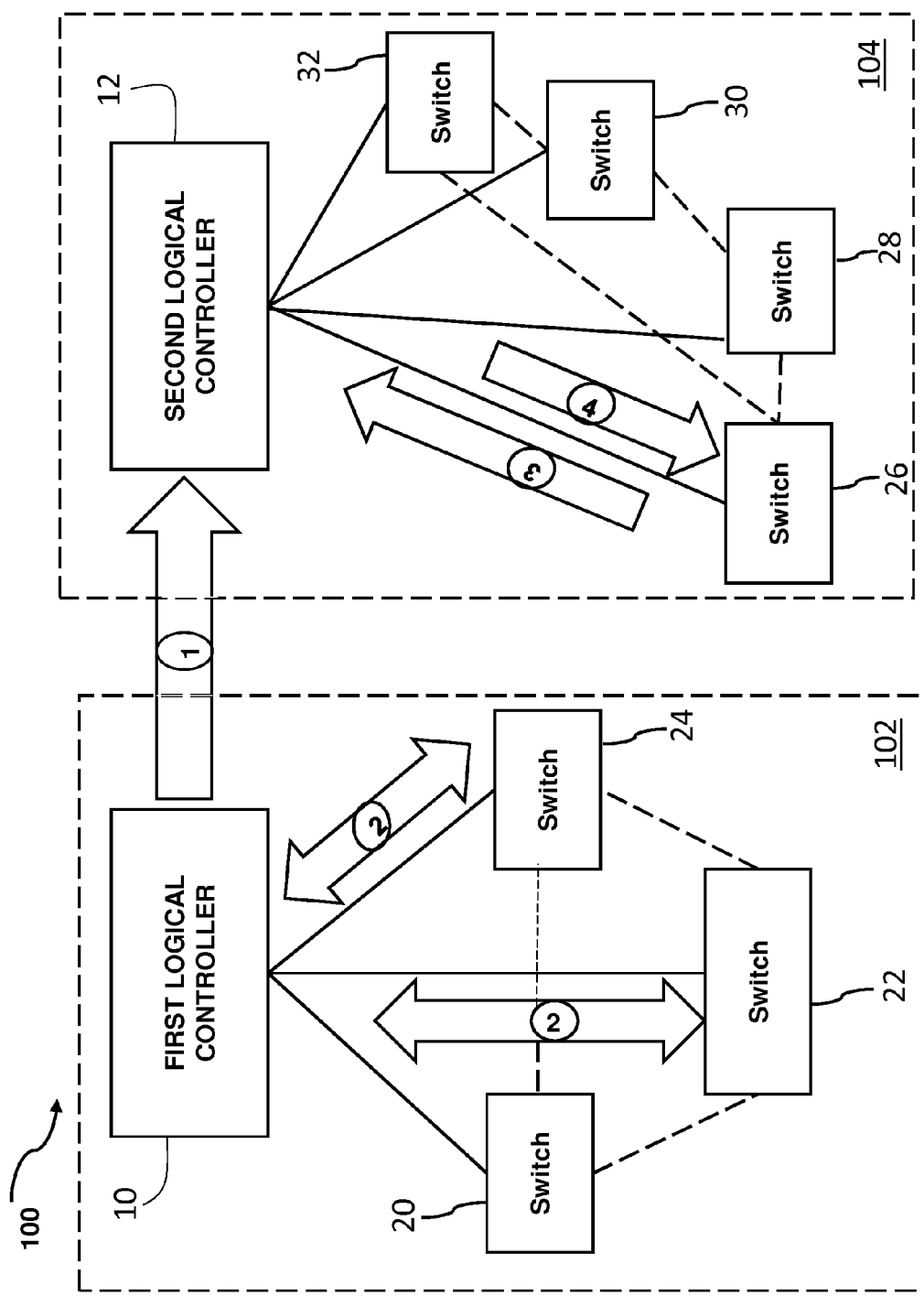
FIG. 1 illustrates a conventional system having a distribution of controllers that manage a plurality of data forwarding units.

Referring now to FIG. 1, a conventional network System 100 having distributed controllers, two of which are shown 102 and 104, is illustrated, where the distributed controller 102 includes a first logical controller 10 and first through third switches 20, 22 and 24, and the distributed controller 104 includes a second logical controller 12 and fourth through seventh switches 26, 28, 30 and 32. As will be understood by those of skill in the art, the first through seventh switches 20-32 are data forwarding units.

Before adding a flow entry to a data forwarding unit, each of the distributed controllers 102, 104 proactively communicates flow entry details to all of the logical controllers present in a datapath of the system 100. The proactive communication of flow entries between the distributed controllers 102, 104 is performed to forward data packets between the data forwarding units in case of a miss-flow entry associated with the data packet. In an example, steps illustrating the passing of data packet information along a datapath are shown with the numbered arrows 1-4 in FIG. 1.

In a first step 1, the first logical controller 10 of the distributed controller 102 communicates flow entry details to the second logical controller 12 of the distributed controller 104. In a second step 2, the first logical controller 10 adds flow entries to the second and third switches 22 and 24. (Note, for a given end-to-end traffic, one or more switches in general are involved. FIG. 1 represents just one example case. In this example, the second and third switches 22 and 24 are involved, while in other examples, the first switch 20 may play a role for that particular traffic).

If the fourth switch 26 is associated with a miss-flow entry, then the fourth switch 26 contacts the second logical controller 12 to obtain the flow information in order to forward the packet (step 3). In step 4, the second logical controller 12, which has stored the information communicated by the first logical controller 10, provides the flow entry to the fourth switch 4 so that the data packet may be forwarded between the fifth, sixth, and seventh switches 28, 30, 32. Thus, in the example shown, the conventional network system 100 requires the distributed controllers 102, 104 to proactively communicate or proactively synchronize flow entries to the logical controllers 10, 12 distributed in the system 100.

The present invention provides a network control system comprising plurality of components to control the flow of a data packet between various data forwarding units in a distributed controller environment. The present invention also provides a method for managing traffic flow in a distributed controller environment. The method adds flow information to a packet in order to manage the traffic flow.

Figure 2:
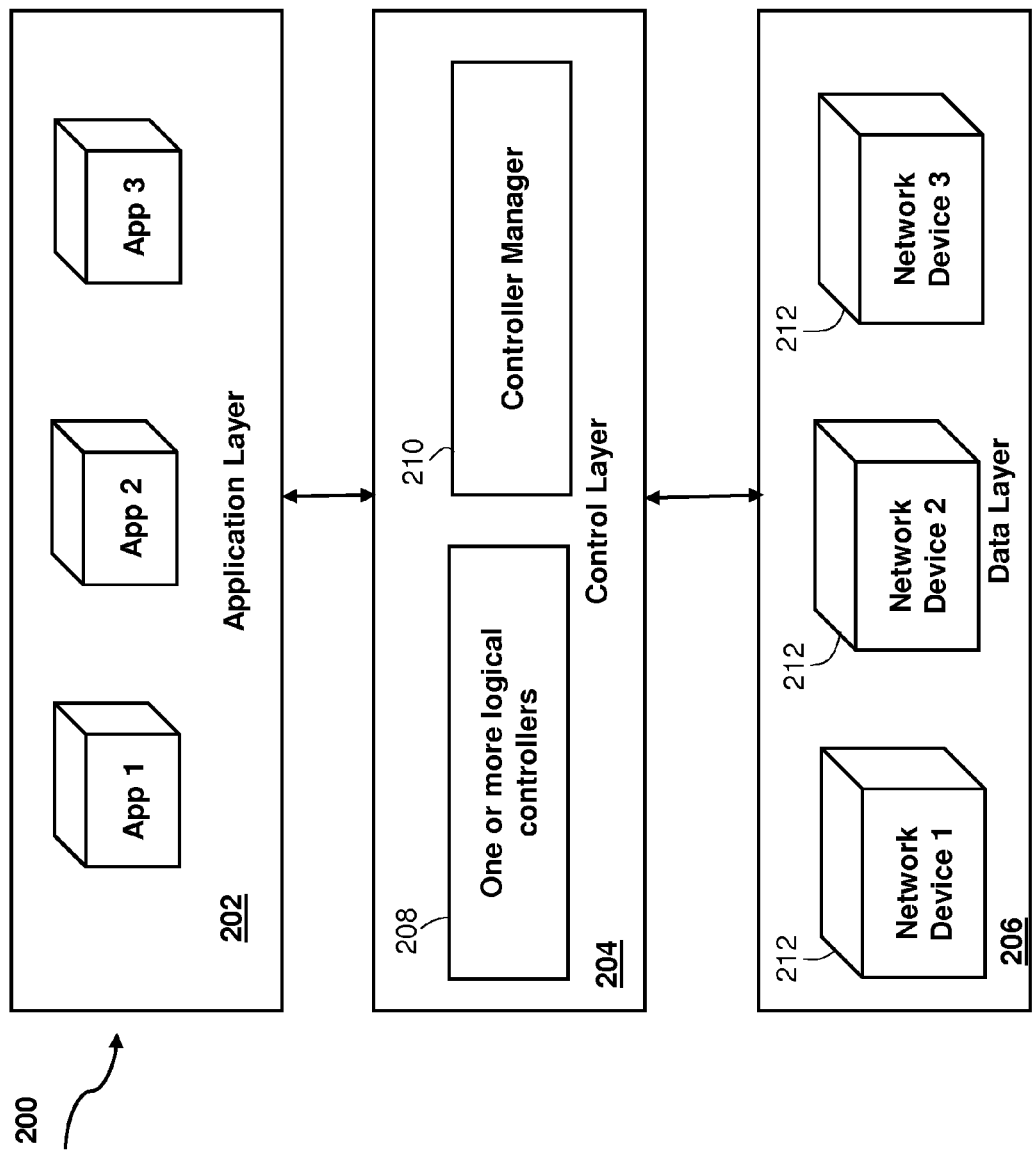
FIG. 2 is a schematic diagram of a view of the layers of a network control system in accordance with an embodiment of the present invention.

Referring now to FIG. 2, an implementation of a network control system 200 in accordance with an embodiment of present invention is shown. In the embodiment shown, the network control system 200 comprises an application layer 202, a control layer 204 and an infrastructure or data layer 206. The application layer 202 comprises plurality of applications, three of which are shown App 1, App 2 and App 3. The control layer 204 comprises one or more logical controllers 208 and a controller manager 210. The logical controllers 208 control a flow in a datapath. The controller manager 210 manages the one or more logical controllers 208. The infrastructure or data layer 206 comprises one or more network devices or data forwarding units 212. The network devices 212 may include a switch (LAN switch or a packet switch), and a router. The logical controllers 208 in the control layer 204 are configured to push the flow entry to the network devices 212 in order to forward the packet to the destination.

The controller manager 210 is configured to manage the logical controllers 208 in a distributed network. The network control system 200 further comprises a communication unit (not shown) that enables communications between the logical controllers 208 and the controller manager 210, and between the logical controllers 208 themselves.

It will be understood by those of skill in the art that the network control system 200 may be implemented in a variety of computing systems, such as a laptop computer, a desktop computer, a notebook computer, a workstation, a mainframe computer, a server, a network server, and the like. It also will be understood that the network control system 200 may be accessed by multiple users through one or more user devices, or applications residing on the user devices. Examples of the user devices include a portable computer, a personal digital assistant, a handheld device, and a workstation. The user devices are communicatively coupled to the network control system 200 through the distributed network.

The distributed network may include a wireless or a wired network or a combination thereof, such as a telephone network, electronic data networks (e.g., the internet), and a transportation network. The distributed network may be implemented in various ways, such as an intranet, local area network (LAN), wide area network (WAN), via the internet, and the like. The network also may be either a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the distributed network may include a variety of network devices, including routers, bridges, servers, computing devices, storage devices, and the like.

Figure 3:
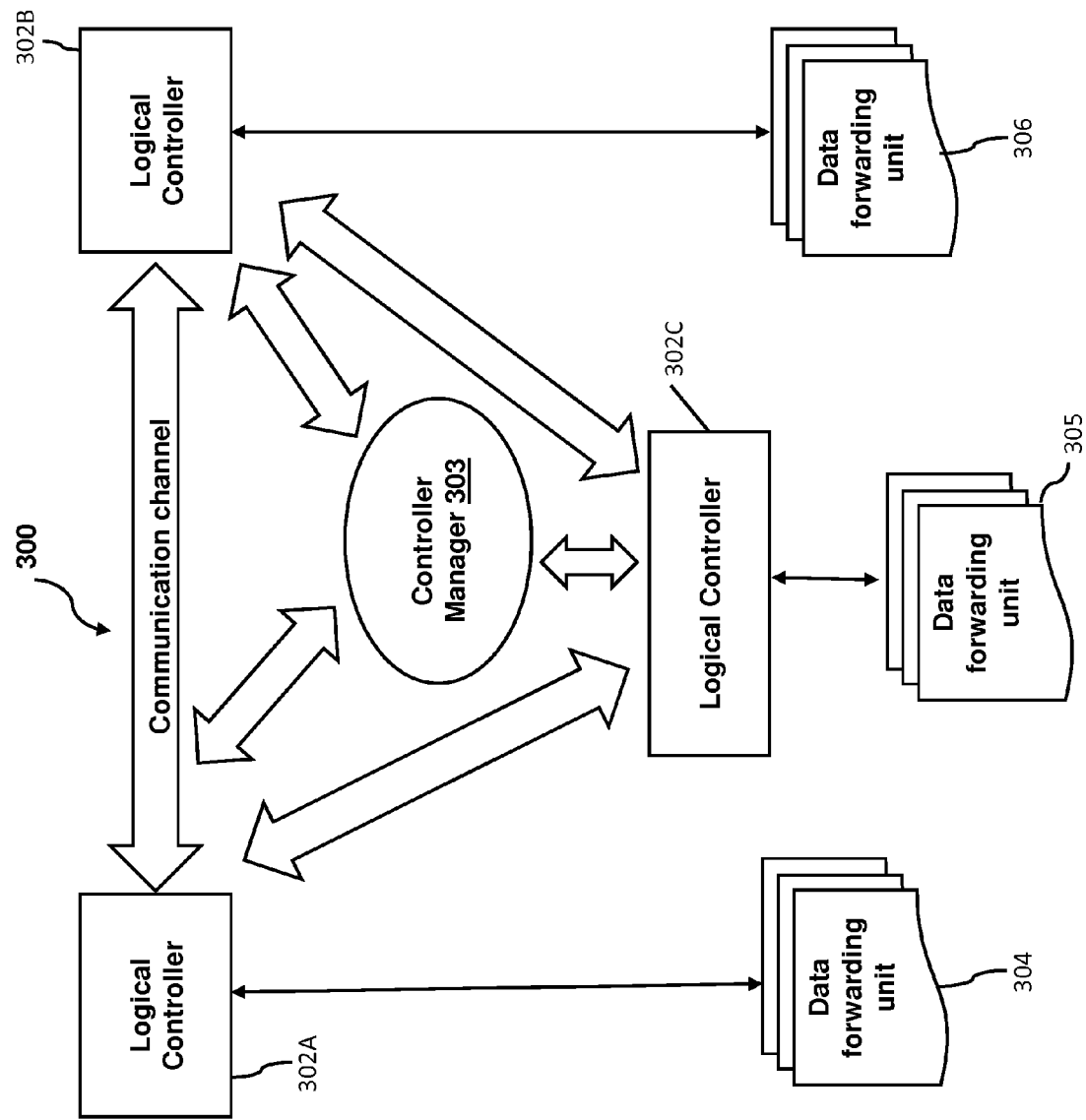
FIG. 3 is a schematic block diagram of a network control system in accordance with an embodiment of the present invention.

FIG. 3 illustrates a network control system 300 in accordance with one embodiment of the present invention. The network control system 300 comprises a plurality of logical controllers 302, where three are shown, 302A, 302B and 302C, and a controller manager 303 that controls the logical controllers 302 (where 302 refers to the logical controllers 302A-302C collectively). Each of the logical controllers 302A, 302B and 302C is configured to manage a respective plurality of data forwarding units 304, 305 and 306. Examples of the data forwarding units 304-306 comprise switches, routers and the like.

Each of the logical controllers 302A-302C comprises a flow entry pushing module (not shown) configured to push a flow entry to a respective one of the data forwarding units 304, 305 and 306. The data forwarding units 304-306 store flow tables and the flow tables contain flow entries.

Each data forwarding unit typically contains a pipeline of tables that are used to process packet data while passing the data packet through the pipeline. Some examples are Firewall ACL rule table, Routing Tables and IPSec Table. Each table contains a set of rules called Table Flow entries. That is, a data packet passes through the flow table, and a flow entry represents a route or path to be followed by the packet to reach a destination point or device.

The flow entry contains a set of match fields and a list of actions. As part of a table lookup, the packet data fields are compared with the match fields of each flow entry in order to match the packet. Once a packet matches one of the flow entries, the list of actions associated with the flow entry is performed by the data forwarding unit to process the packet. The set of actions includes stamping the data packet with the flow control information. That is, the data forwarding unit stamps the packet with the flow control information based on the set of actions. In accordance with the present invention, the stamping is performed to identify an original controller (e.g., logical controller 302A) in case there is a miss-flow entry in the data forwarding unit. By using this action, the original controller (the one that actually created and pushed the flow entry into one of the tables of the data forwarding unit) details are stamped in the packet as part of its packet context. Flow control information is used to identify an original controller defining the flow of a data packet if there is a miss-flow entry in a data forwarding unit.

The stamped flow control information comprises one or more IP option field actions. The IP option field actions include a port at which the packet may be received, a physical port for receiving the packet, an ID of the controller that created the flow, and an ID assigned to flow. By stamping the flow control information, the network control system 300 avoids the pro-active synchronization performed by the conventional system 100.

When the same packet reaches a next data forwarding unit, sometimes there is no matching flow entry so it may not hit any of the flow entries in the table and thus this next data forwarding unit won't know what to do with the packet. Actually by default each table contains one entry called miss-entry (it is a low priority entry, all the match fields are wild-carded and the action typically is to send packet to the controller). That is when the packet doesn't find any flow entry, it will hit the default miss-entry. So when packet hits miss-entry, part of its action, the packet reaches the controller. The controller receives the packet and will process the packet and push a new flow entry into the data forwarding unit to handle subsequent packets. But sometimes the receiving controller is not the original controller. If the controller is not the original owner, then the controller needs to contact the original controller to obtain the correct flow entry details. However, according to the present invention, because of the "Stamped Flow Controller Information in the Packet" the packet already contains the original controller to contact.

Table 1 provides an example of the IP option field actions in a packet stamped with the flow control information:

TABLE 1

| Data type | Description | Bytes | Optional/Mandatory |
|---|---|---|---|
| InPort_Type | Port at which packet is received | 4 | Mandatory |
| InPhyPort_Type | Physical port at which data is received | 4 | Optional |
| Controller_ID_Type | 4 | 4 | Mandatory |
| Flow_ID_Type | ID assigned to flow | 8 | Mandatory |

Table 2 below provides an example format of the stamped flow control information:

TABLE 2

| Length | InPort Type | InPort value | InPhyPort Type | InPhyPort Value | Controller ID Type | Controller ID value | Flow_ID Type | Flow ID Value |
|---|---|---|---|---|---|---|---|---|

Figure 4:
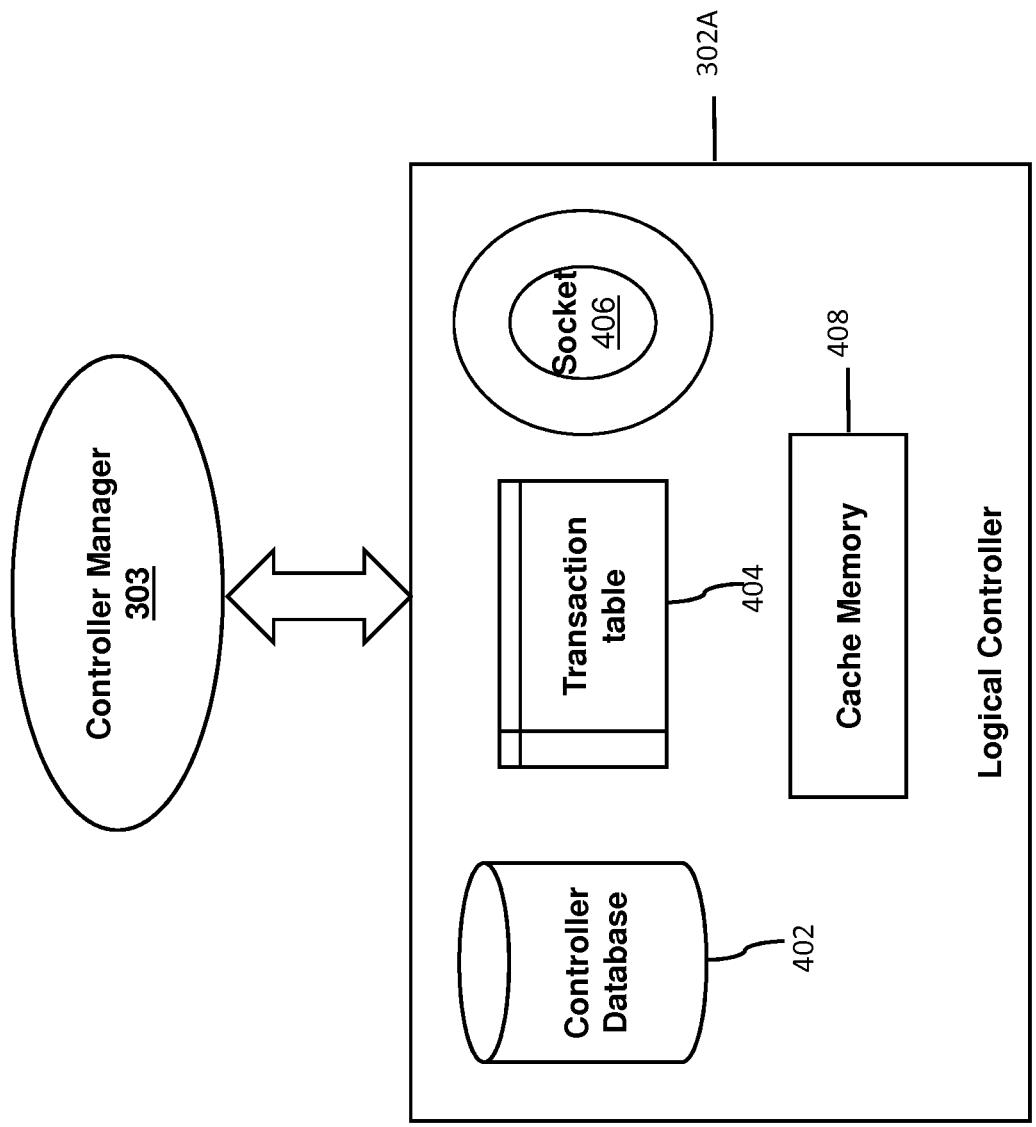
FIG. 4 is a schematic block diagram of a logical controller of the network control system of FIG. 3 in accordance with an embodiment of the present invention.

Referring to FIG. 4, in one embodiment, each of the logical controllers 302 (just logical controller 302A is shown; the following discussion is described in regards to logical controller 302A but applies to the other logical controllers 302B and 302C too) comprises a controller database 402, a transaction table 404, a socket 406, and a cache memory 408. The logical controller 302A stores details of the other logical controllers (for example logical controllers 302B and 302C) distributed in the network control system 300 in the controller database 402. The controller database 402 stores data such as a controller IP, Port number and flow cache. The controller IP is the IP address of the controller. Each controller listens to a pre-defined port to receive flow entry requests from other controllers in the system 300. The transaction table 404 stores details of flow request messages issued to the plurality of logical controllers 302. The cache memory 408 comprises cache entries of flow entry details of each of the logical controllers 302 in the network control system 300. The transaction table stores flow entry requests sent to the original controller because a response to an earlier flow entry request can come asynchronously at a later point in time. Once a response comes back, along with sending back flow entry details, the data forwarding unit adds flow entry details to the flow cache belonging to the logical controller so that the flow entry requests of the flow can be addressed locally. Unused flow entries are deleted from the cache memory 408 at regular intervals. The socket 406 establishes a communication between the logical controllers 302 in the network control system 300. That is, a TCP connection exists between logical controllers. This TCP connection is used as a channel for the communication between the controllers. Whenever a new logical controller is added to the system, the new logical controller establishes a TCP connection to all the current logical controllers in the system.

As previously discussed, the network control system 300 includes a controller manager 303 configured to manage the plurality of controllers 302 in the network control system 200. In one embodiment, the controller manager 306 is configured to assign a controller ID to each of the logical controllers 302 in the network control system 300. The controller manager 303 is further configured to update one or more logical controller details at each of the logical controllers 302. The one or more logical controller details comprise controller ID, IP address, and port number.

The controller manager 303 manages each of the logical controllers 302 and receives messages from each of the logical controllers 302. The messages may include a message about addition of a new logical controller or deletion of a logical controller from the network control system 300. The controller manager 303 further is configured to register each of the logical controllers 302 and receives a TCP port number and IP address while registering each of the logical controllers 302. Upon successful registration of each of the logical controllers 302, the controller manager 303 assigns a controller ID to each of the logical controllers 302.

The controller manager 303 also updates the controller ID of each of the logical controllers 302 at the logical controllers 302. For example, the controller manager 303 may update an ID of a new logical controller by informing each of the other logical controllers 302 of the addition of the new logical controller. The controller manager 303 would also update or share details of each of the logical controllers 302 with the new logical controller. The new logical controller could then communicate with each of the other logical controllers 302.

Referring again to FIG. 3, in one embodiment, the network control system 300 comprises a communication channel to enable communications between the plurality of logical controllers 302 and the controller manager 303. The communication channel is shown by the broad arrows between the logical controllers 302, and between the logical controllers 302 and the controller manager 303. The communication channel between logical controllers 302 and between logical controllers and the control manager 303 comprises a Transmission Control Protocol (TCP) channel.

Figure 5:
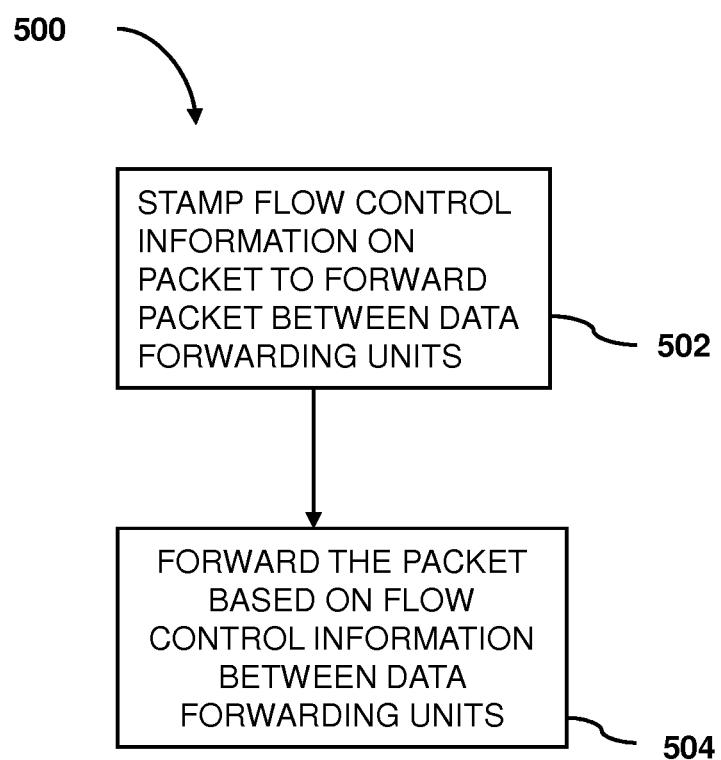
FIG. 5 is a flow chart of a method for managing flow traffic in a distributed controller environment in accordance with an embodiment of the present invention.

Referring now to FIG. 5, a method 500 for managing traffic flow in a distributed controller environment is shown, in accordance with an embodiment of the present invention. The method 500 may be described in the general context of computer executable instructions. Generally, computer executable instructions may include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the steps of the method 500 are described is not intended to be construed as a limitation, and any number of the described steps may be combined, executed out of order, or executed simultaneously. Additionally, individual steps may be omitted without departing from the spirit and scope of the present invention. Furthermore, the method 500 may be implemented in any suitable hardware, software, firmware, or combination thereof. However, for ease of explanation, in the embodiments described below, the method 500 may be considered to be implemented in the above-described network control systems 200 and 300.

At step 502, a data packet is stamped with flow control information by a data forwarding unit and in accordance with the present invention, the flow control information includes an ID of the controller that created the flow, and an ID assigned to flow. At step 504, the flow entry is pushed to one or more of the data forwarding units (e.g. 304, 305, 306). For example, the logical controller 302A pushes the flow entry to the data forwarding unit 304. The data forwarding unit 304 is managed by the logical controller 302A.

Figure 6:
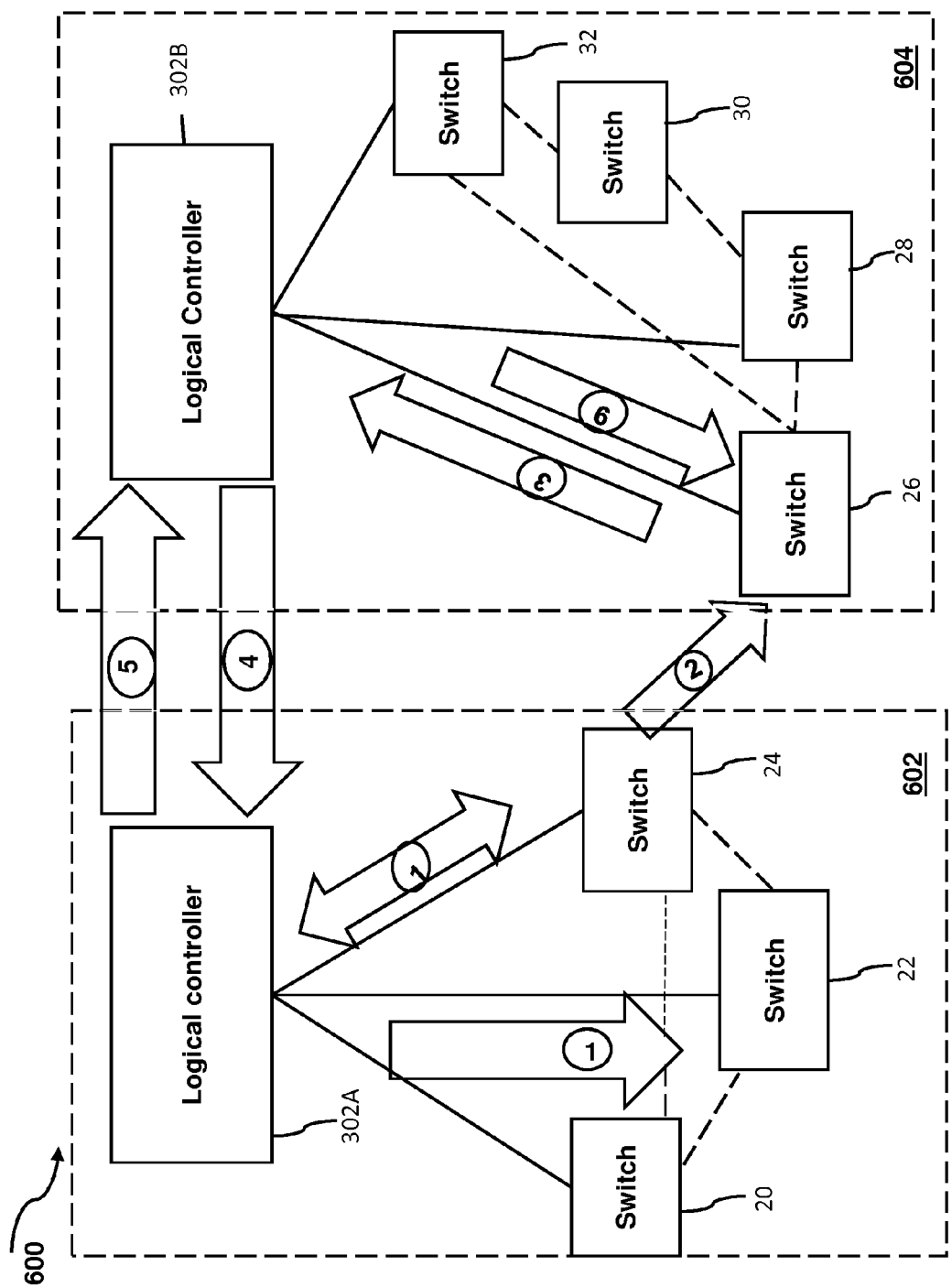
FIG. 6 is a schematic diagram illustrating the flow of data in a method for managing traffic flow in accordance with an embodiment of the present invention.

Referring to FIG. 6, a network system 600 is shown to illustrate an example of the method 500 for managing flow traffic. The system 600 includes distributed controllers 602 and 604. The distributed controller 602 includes the logical controller 302A and data forwarding units (i.e., switches 20, 22 and 24), while the distributed controller 604 includes the logical controller 302B and data forwarding units (i.e., switches) 26, 28, 30 and 32.

In this example, the distributed controller 602 receives a data packet and stamps the data packet with flow control information. Description of the examples of the flow control information is similar to as explained above in the network control system 200. The flow control information is masked with a 32 bit controller ID, an action to set a controller ID in an IP option in order to identify a controller creating a flow for the data packet. That is, the logical controller 302A adds flow entries to the first-third switches 20, 22, 24 to define a flow of a packet in the distributed network 600.

In a first step 1 (shown by arrows 1), the flow entry generated by the logical controller 302A is pushed by the second and third switches 22, 24 by the logical controller 302A. In step 2 (indicated by the arrow 2), the data packet flows from the third switch 24 to fourth switch 26 of the distributed controller 604. The fourth switch 26 receives the packet stamped with the flow control information, but it when the fourth switch 26 compares the flow entry to the entries in its flow table, it gets a miss-flow entry.

In step 3, the fourth switch 26 contacts it's logical controller 302B in order to receive the flow information. That is, when the switch 26 doesn't know what to do with the packet, the packet is sent to the logical controller 302B. The logical controller 302B opens the packet and reads the stamped flow control information to identify the original controller. The original controller is the logical controller that defined the flow of the packet in the datapath. The logical controller 302B reads the flow control information and at step 4 contacts the logical controller 302A (identified as the original controller) to request a flow entry therefrom. At step 5, the logical controller 302A sends a flow entry to the logical controller 302B.

At step 6, based on the flow control information, if the logical controller 302A is identified as the original controller (the controller defining the flow of the packet in the network), the logical controller 302B may directly add the flow entries to the fourth switch 26 so that the packet may be forwarded to the fifth-seventh switches 28, 30 and 32 (i.e., the other switches in contact with the fourth switch 26).

Note that the response message from the logical controller 302A (step 5) to the logical controller 302B may be sent asynchronously. The flow entry based on the response message avoids a delay that could be caused because of the drop of the flow entry due to network traffic and the pro-active synchronization, as proactive synchronization may result in resource limitation. Also, the request based receipt of flow entry avoids maintenance of flow entries at all of the logical controllers in the network 600.

Figure 7:
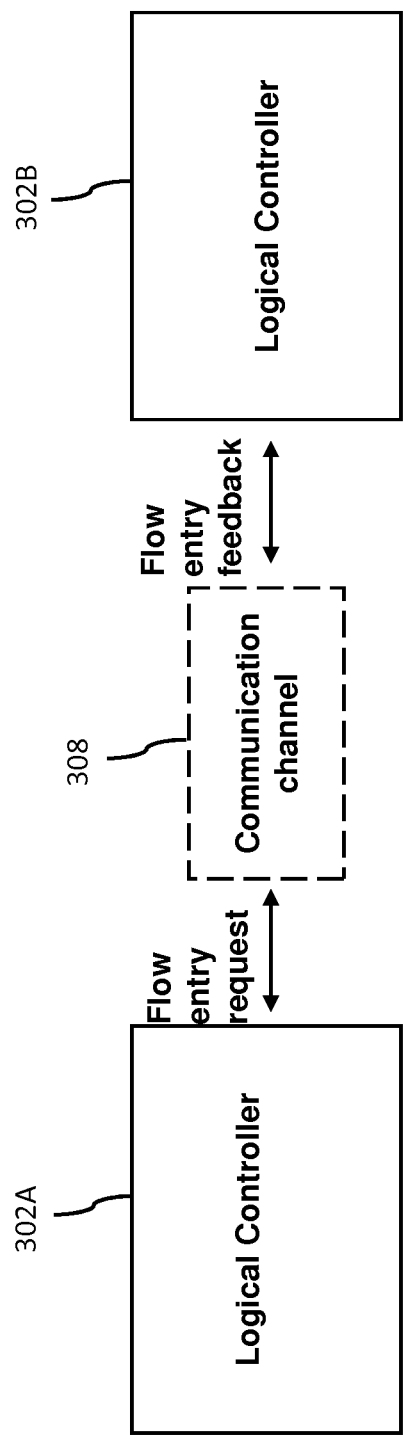
FIG. 7 is a schematic block diagram illustrating transmission of a request message from one controller to another controller in accordance with an embodiment of the present invention.
Figure 8:
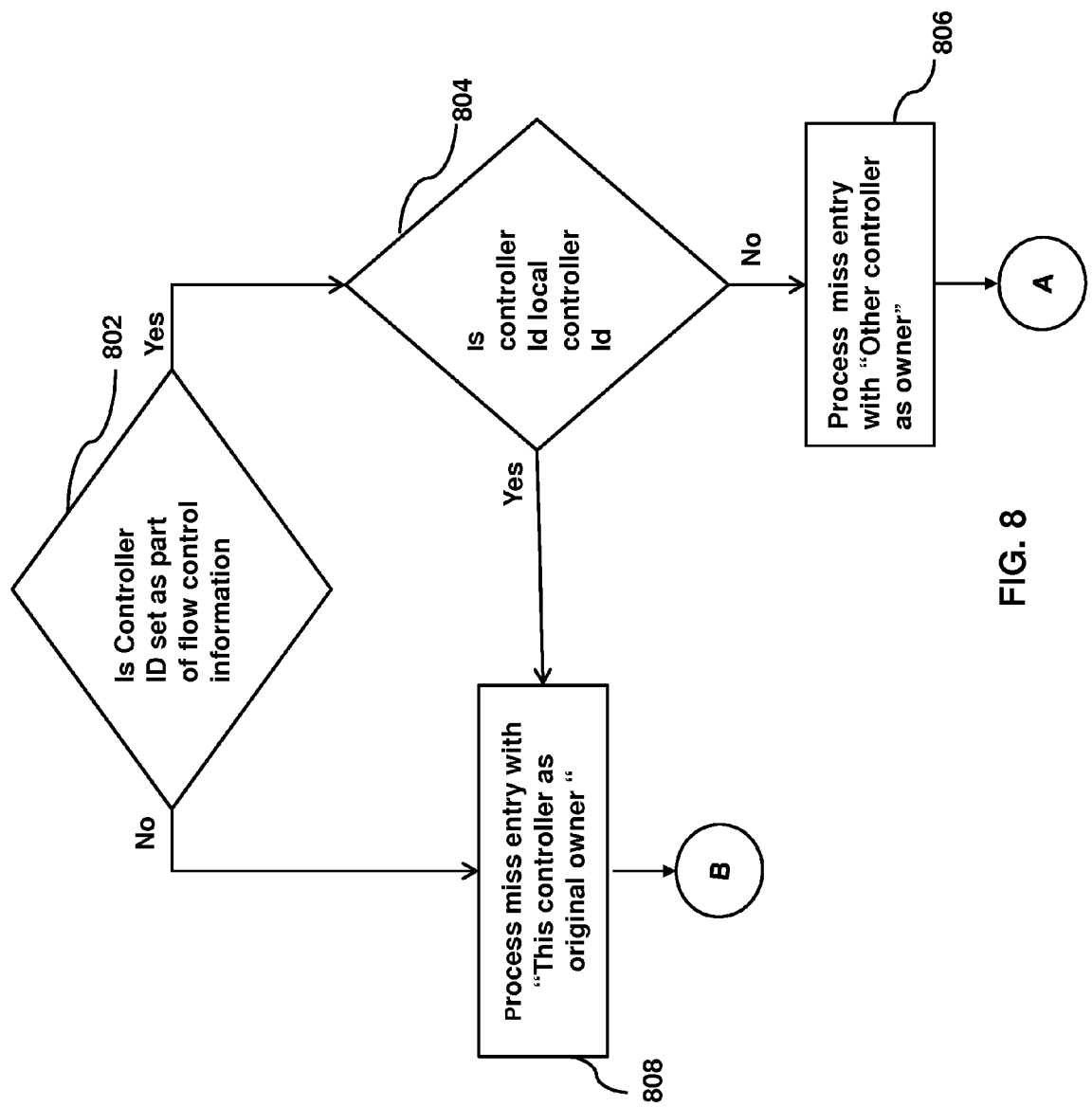
FIGS. 8, 9, 10 and 11 are a flow chart of a method for managing traffic flow using flow control information in accordance with an embodiment of the present invention.

Referring to FIG. 7 and bearing in mind the example discussed with reference to FIG. 6, a request for a flow entry from the logical controller 302B to the logical controller 302A is shown. The logical controller 302B transmits a message to the logical controller 302A requesting a flow entry in order to define the flow for the packet in case of a miss-flow entry. Table 3 shows an example format of a message transmitted or received between the logical controller 302B and the logical controller 302A.

TABLE 3

| CID | XID | OPR | Payload Data |
|-----|-----|-----|--------------| where, CID: Controller ID of sender/receiver
XID: Transaction ID, same ID is used during feedback/response
OPR: Operation or purpose of the message. For example: Flow_Request_Message (requesting for flow entry) and Flow_Response_Message (sending feedback/response).

The message for the flow entry request comprises InPort (port on which the packet is received) and Flow ID (Identifier of flow entry). The message for the flow response comprises flow entry details of earlier flow requests.

The logical controller 302B updates cache information stored in a cache memory in accordance with the flow entries received as the response message from the logical controller 302A. In a similar scenario, before transmitting the request message to the logical controller 302A, the logical controller 302B checks for the flow entries in a cache memory. If the flow entries are present in the cache memory, the logical controller 302B defines the flow of the packet without making a request to the logical controller 302A.

In another example, based on flow control information, if the logical controller 302B is the original controller, then the logical controller 302B enters the flow entries into the fourth switch 26 and defines the flow of the packet in the network 600.

FIGS. 8-11 are a flow chart of a method for managing network traffic flow in accordance with an embodiment of the present invention. This method and the flow chart will be described with reference to the system 600 shown in FIG. 6. In this example, the logical controller 302A pushes a flow entry to the second switch 22. The second switch 22 stamps the packet with the flow controller information and then forwards the packet to the third switch 24, which in turn transmits the packet to the fourth switch 26. When the packet reaches the fourth switch 26, there is a miss-flow entry so the fourth switch 26 sends the packet to the logical controller 302B.

At step 802, the logical controller 302B reads the flow control information and checks if the flow control information includes a controller ID. If yes, then step 804 is executed. At step 804, the controller 302B checks if the controller ID is a local controller ID, i.e., here local means itself. If the controller ID is not local (i.e., not 302B in this example), then there is a miss-flow and step 806 is executed. At step 806, the miss-flow entry is processed with other controller (i.e., controller 302A) as the original controller (owner). In FIG. 6, the logical controller 302A is the original controller, so if the data packet did not include the information that controller 302A was the original controller, as checked at step 802, then step 808 would be executed. At step 808, the logical controller 302B processes the miss-entry by stamping the data packet using its own ID as the original controller and then continuing to "B" (step 1102 of FIG. 11).

Figure 9:
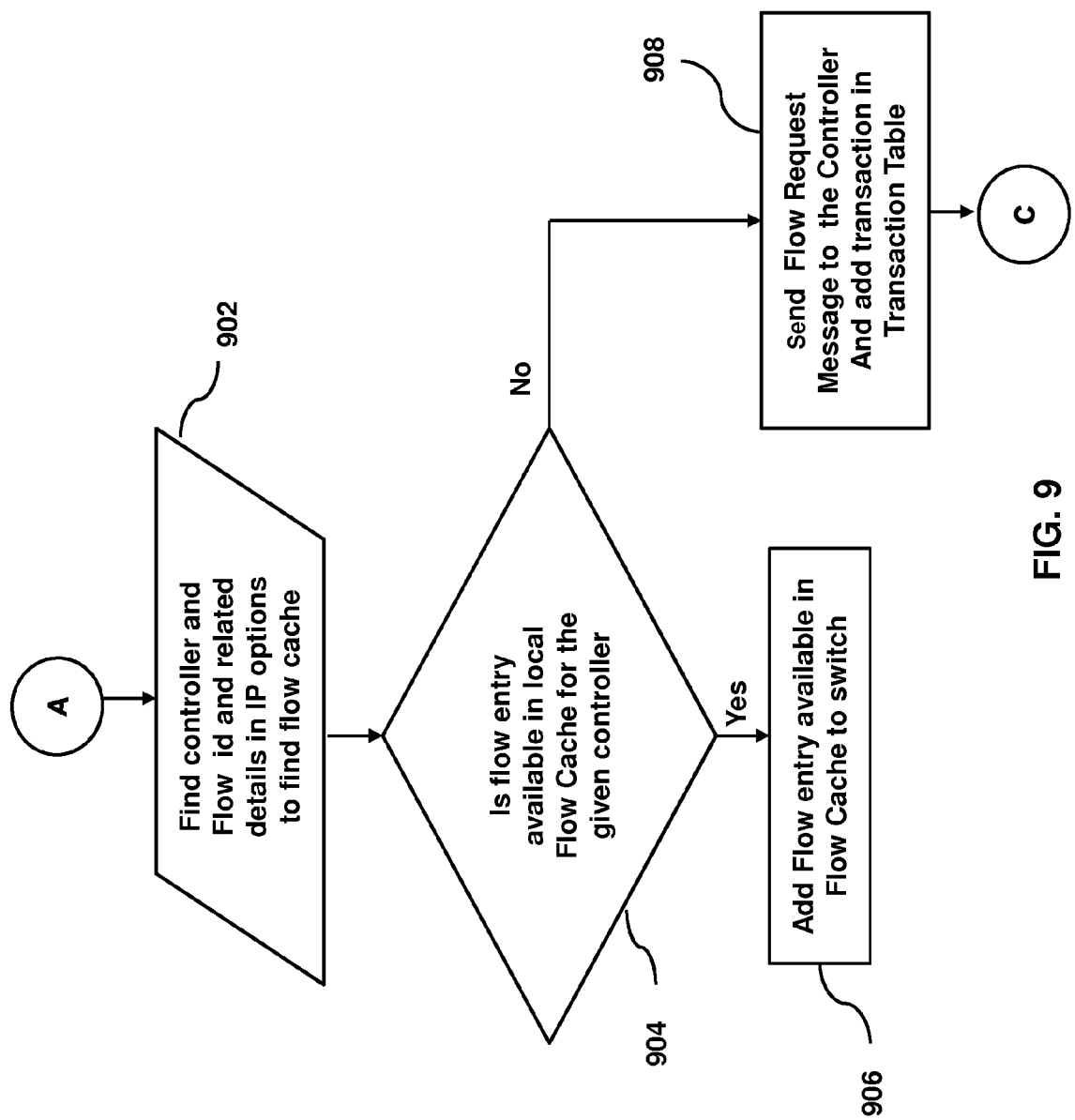

Referring to FIG. 9, after step 806 is performed, at step 902, the logical controller 302B finds the original controller (or owner), which is logical controller 302A, and the flow ID based on the flow control details. The logical controller 302B first checks in the cache memory to find a flow cache. Next, at step 904, the logical controller 302B checks if the flow entry is available in the cache memory. If yes, at step 906, the logical controller 302B adds the flow entry into the fourth switch 26. Thus, if the flow entry is available in the cache memory, the logical controller 302B does not need to contact the logical controller 302A.

However, if at step 904 the flow entry is not available in the local flow cache, then step 908 is performed. At step 908, the logical controller 302B sends a request message to get the flow entry from the logical controller 302A and stores the request message as a transaction in the transaction table.

Figure 10:
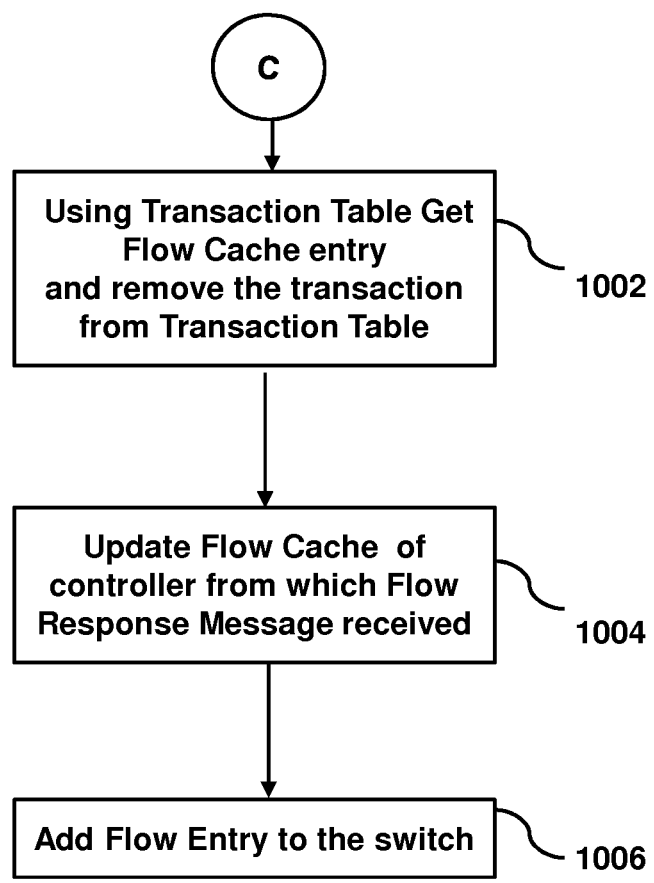
Figure 11:
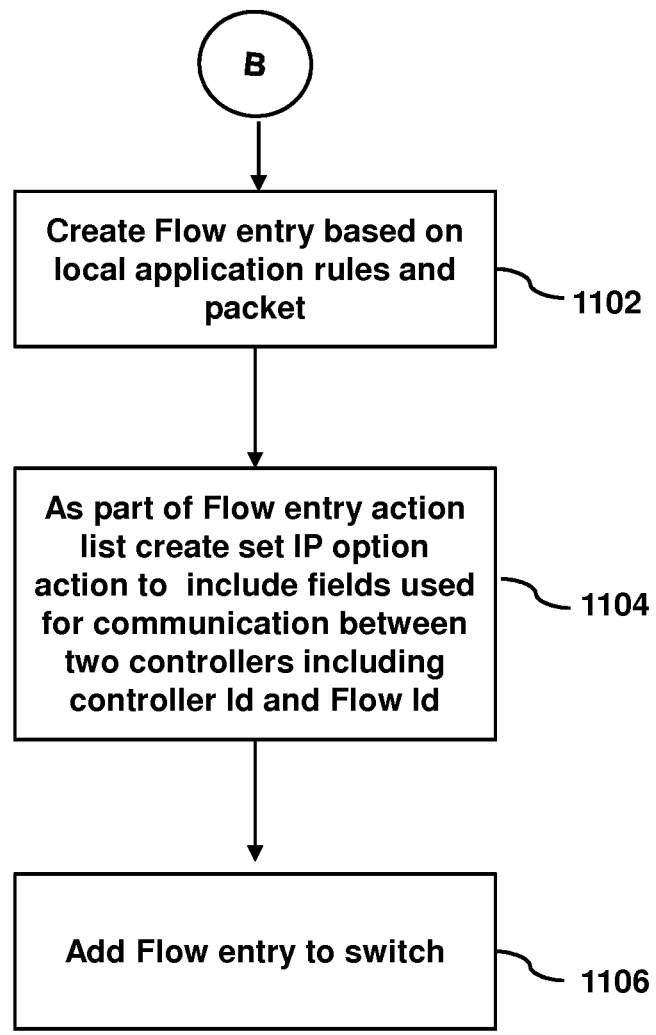

Referring to FIG. 10, at step 1002, based on entry in the transaction table, the logical controller 302B receives a response message regarding the flow entry from the logical controller 302A and stores the response message as a cache entry in its cache memory. Once the flow entry is stored in the cache memory, the logical controller 302B removes the transaction from the transaction table. At step 1004, the logical controller 302A updates the flow cache. At step 1006, based on the response message stored in cache memory, the logical controller 302B adds the flow entry to the fourth switch 26.

At step 808 (FIG. 8), if the logical controller 302B identifies the original controller as itself, the miss-entry is processed with the logical controller 302B as the original controller. At step 1102 of FIG. 11, the logical controller 302B creates the flow entry based on local application rules and the packet, at step 1104, as part of flow entry action list create sets IP option action to include fields used for communication between any two logical controllers including controller Id and flow Id. At step 1106, the logical controller 302B adds the flow entry to the fourth switch 26.

The various actions, acts, blocks, steps, and the like in method 800 may be performed in the order presented, in a different order or simultaneously. Further, in some embodiments, some actions, acts, blocks, steps, and the like may be omitted, added, modified, skipped, and the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A network control system, comprising:
   a plurality of logical controllers, wherein each logical controller is configured to push a flow entry to one or more data forwarding units, wherein the flow entry is associated with a set of actions for forwarding a data packet;
   a data forwarding unit of the one or more data forwarding units that stamps flow control information to the data packet based on the set of actions, wherein each of the one or more data forwarding units is managed by one of the logical controllers;
   a controller manager in communication with the plurality of logical controllers for managing the plurality of logical controllers; and
   a communication channel that enables communication between the plurality of logical controllers and the controller manager,
   wherein the stamped flow control information comprises a logical port receiving the data packet, a physical port receiving the data packet, an identification (ID) of the plurality of logical controllers creating the flow entry, and an ID assigned to the flow entry.

2. The network control system of claim 1, wherein the controller manager updates each of the logical controllers regarding addition and removal of one or more logical controllers from the network control system.

3. The network control system of claim 2, wherein the controller manager registers and assigns a controller ID to each of the logical controllers.

4. The network control system of claim 1, wherein the plurality of logical controllers includes a transaction table, a socket and a controller database.

5. The network control system of claim 4, wherein the transaction table stores transaction details of one or messages transmitted to and received by the plurality of logical controllers with respect to a request for a flow entry.

6. The network control system of claim 4, wherein the controller database stores at least one of a controller ID, a remote IP, a remote port, a connection status, and a flow cache.

7. The network control system of claim 1, wherein the communication channel includes a Transmission Control Protocol (TCP) channel to enable the communication.

8. A network control system, comprising:
- a plurality of logical controllers, wherein each logical controller is configured to push a flow entry to one or more data forwarding units, wherein the flow entry is associated with a set of actions for forwarding a data packet;
- a data forwarding unit of the one or more data forwarding units that stamps flow control information to the data packet based on the set of actions, wherein the stamped flow control information comprises a logical port receiving the data packet, a physical port receiving the data packet, an identification (ID) of the plurality of logical controllers creating the flow, and an ID assigned to the flow entry, and wherein each of the one or more data forwarding units is managed by one of the logical controllers;
- a controller manager in communication with the plurality of logical controllers for managing the plurality of logical controllers, wherein the controller manager updates each of the logical controllers regarding addition and removal of one or more logical controllers from the network control system, and registers and assigns a controller ID to each of the logical controllers, and wherein:
  (a) the plurality of logical controllers includes a transaction table and a controller database,
  (b) the transaction table stores transaction details of one or messages transmitted to and received by the plurality of logical controllers with respect to a request for a flow entry, and
  (c) the controller database stores at least one of a controller ID, a remote IP, a remote port, a connection status, and a flow cache; and
- a communication channel that enables communication between the plurality of logical controllers and the controller manager.

9. A method for managing traffic flow in a distributed controller environment, the method comprising:
- pushing, by a logical controller of a plurality of logical controllers, a flow entry to one or more data forwarding units, wherein the flow entry is associated with a set of actions for forwarding a data packet, and wherein the data forwarding units are managed by the logical controller;
- stamping, by one of the one or more data forwarding units, flow control information to the data packet based on the set of actions; and
- forwarding the data packet by the one or more data forwarding units to other ones of the data forwarding units,
- wherein the stamped flow control information comprises a logical port receiving the data packet, a physical port receiving the data packet, an identification (ID) of the logical controller creating the flow entry, and an ID assigned to the flow entry.

10. The method of claim 9, wherein the flow control information is masked with a controller ID, and an action to set a controller ID in an IP option in order to identify the logical controller that created the flow entry for the data packet.

11. The method of claim 9, wherein said forwarding comprises:
- identifying a logical controller from the plurality of logical controllers based on the stamped flow control information;
- requesting the identified logical controller provide flow entry details;
- pushing the flow entry details to the one or more data forwarding units; and
- forwarding the packet based on the flow entry details.

12. The method of claim 9, wherein said forwarding comprises:
- identifying a flow entry based on cache details; and
- forwarding the packet in accordance with the identified flow entry.

13. The method of claim 12, wherein the cache details identify the logical controller that pushed the flow entry to the one or more data forwarding units.

* * * * *